United States Patent
Campbell

[11] Patent Number: 6,048,264
[45] Date of Patent: Apr. 11, 2000

[54] SELF-SEALING APPARATUS AND METHOD FOR DIRECTING PRESSURIZED AIR INTO A VEHICLE OR OTHER COMPARTMENT

[76] Inventor: Gordon Douglas Campbell, 6388 Alder Street, Vancouver, British Columbia, Canada, V6M 3J8

[21] Appl. No.: 08/730,147

[22] Filed: Oct. 15, 1996

Related U.S. Application Data

[63] Continuation of application No. 08/516,448, Aug. 17, 1995, abandoned.
[51] Int. Cl.$^7$ ...................................................... B60H 1/26
[52] U.S. Cl. .............................. 454/131; 34/104; 454/66; 454/119; 454/200
[58] Field of Search .................................. 454/49, 63, 66, 454/119, 131, 141, 143, 200, 338; 34/74, 271, 90, 104, 666; 422/124

[56] References Cited

U.S. PATENT DOCUMENTS 4,515,070  5/1985  Bobjer et al. ...................... 454/200 X
5,245,763  9/1993  Neikter ................................ 454/141 X

FOREIGN PATENT DOCUMENTS 32 353  8/1962  Finland ..................................... 169/48

*Primary Examiner*—Harold Joyce

[57] ABSTRACT

Apparatus for directing a flow of pressurized air into a vehicle or other compartment includes an air bag inflatable in response to the flow of pressurized air. The air bag includes an inlet opening for receiving the flow and an outlet opening for delivering the flow inside the compartment. Further, the air bag is sized to permit a first portion of the bag, including the outlet opening, to remain inside the compartment while a second portion is withdrawn through a compartment opening. Upon inflation, the bag then expands with air sealing pressure against the perimeter of the compartment opening.

12 Claims, 6 Drawing Sheets

6,048,264

SELF-SEALING APPARATUS AND METHOD FOR DIRECTING PRESSURIZED AIR INTO A VEHICLE OR OTHER COMPARTMENT

This application is a continuation of application Ser. No. 08/516,448, filed Aug. 17, 1995 abandoned.

FIELD OF THE INVENTION

This invention relates to apparatus and methods for directing a flow of pressurized air into the interior region of a vehicle or other compartment.

BACKGROUND TO THE INVENTION

There can be various reasons for wanting to direct a flow of pressurized air into the interior region of a vehicle or other compartment. By way of example, if one considers the passenger compartment of a motor vehicle, these reasons include:

- to assist in the location of air leaks from the compartment through window seals, door seals, or other parts of the vehicle body. These leaks can be the result of manufacturing defects or subsequent damage which is not adequately repaired. Sometimes they are very difficult to locate. They can contribute to unwanted wind noise, and they can serve to admit dust into the vehicle.
- to assist in drying the compartment. If a passenger compartment is inadvertently exposed to rain or snow, then depending upon the degree of wetness it may take a considerable period of time to dry out if left to do so under ambient air conditions. In extreme cases, including situations where a vehicle may have been submerged in water, the drying process may need to be expedited to avoid the growth of mold or mildew.
- to assist in deodorizing the compartment. Any number of smells, including smoke, can gradually build up and create a negative atmosphere within a vehicle. A flow of pressurized air with ozone is one way of removing such odors.

In the case of vehicles, European Patent Application No. 93115756.4 (Hubert), entitled Apparatus And Method For Deodorizing A Vehicle And Detecting Air Leaks, published on Apr. 6, 1994, discloses apparatus and method for admitting or directing a flow of pressurized air into the passenger compartment of a vehicle. This apparatus includes an air inlet fitting to be mounted in a window opening in a door of the vehicle, and a relatively large flexible sheet which extends outwardly from the fitting sufficiently far that the sheet can be captured near its outer edge between the door and door frame when the door is closed. With a small opening provided in the sheet to lessen the chance of damage to the sheet from the door latch, the sheet then serves as a seal which blocks the flow of air back through the open window.

With the foregoing arrangement, the sheet is subject to wear and tear through repeated openings and closing of vehicle doors on the sheet. In addition, the arrangement requires adjustment and manipulation which can be awkward to ensure that the sheet is properly aligned for complete capture of its outer edge between the vehicle door and door frame.

It may be noted that the apparatus disclosed in Hubert can be used other than in conjunction with a vehicle window, door and door frame. But, regardless of the type of application, some additional means is required to secure the sheet in a way which allows the sheet to act as a seal. The sheet must be sized not only for the opening, but also for whatever additional means will be used to secure the sheet in a way which provides a seal.

The primary object of the present invention is to provide a new and improved apparatus and method for directing a flow of pressurized air into the interior region of a vehicle compartment or other compartment, and which avoids limitations or difficulties as noted above in the case of Hubert.

SUMMARY OF THE INVENTION

In accordance with one broad aspect of the present invention, there is provided an apparatus for directing a flow of pressurized air from an external source of such air into a compartment through an opening in the compartment. The apparatus comprises an air bag having an air inlet opening for receiving the flow of pressurized air and an air outlet opening for delivering the flow inside said compartment. A first portion of the air bag is positionable inside the compartment while a second portion connected to the first portion through the compartment opening is positioned outside the compartment. The first portion includes the air outlet opening. The air bag is inflatable in response to the flow of pressurized air and is sized to then expand against and provide an air pressure seal against the perimeter of the compartment opening while delivering the flow into the compartment with the first and second portions positioned as aforesaid. In a preferred embodiment, the apparatus includes an air inlet fitting mountable in the compartment opening to form at least one smaller opening having a closed perimeter defined by a portion of the outer perimeter of the fitting and a portion of the perimeter of the compartment opening. The fitting includes an air inlet port having an input opening for receiving the flow of pressurized air as an input from the source, and an output opening for delivering the flow of air as an output. In this preferred embodiment, the apparatus further includes means for connecting the input opening of the port in air flow communication with the source, and means for connecting the air inlet opening of the air bag in air flow communication with the output opening of the port. The air bag is sized to permit a first portion of the bag (including the bag's outlet opening) to remain inside the compartment while a second portion which merges with the first portion is withdrawn outside the compartment through the smaller opening. The first and second bag portions have respective sizes such that they are then responsive to the flow of pressurized air through the bag to inflate on opposite sides of the smaller opening sufficiently to cause the bag to expand against the compartment and the fitting with air sealing pressure along the perimeter of the smaller opening.

It will be apparent that the foregoing arrangement requires no special means in order to seal the smaller opening which is formed when the air inlet fitting is installed. The air bag itself, when inflated in response to the flow of pressurized air being directed into the compartment, performs the sealing function. In this sense, the apparatus can be considered to be self-sealing.

The sealing function is performed along the shortest line where sealing is required, viz. along the perimeter of the opening (the smaller opening) where sealing is desired; and not along a significantly longer line which may be distant from the opening (such as the line between a door and a door frame as in the case of Hubert, supra). Since the air bag is secured only to the fitting and not by some additional mechanism such as a door and door frame distant from the opening to be sealed, it is not open to wear and tear that another mechanism may cause, and it does not need to be sized except to accommodate the opening to be sealed.

Particularly where it is desired to direct pressurized air into the passenger compartment of vehicles, it is contemplated that the fitting will have a transverse cross-section which is generally circular and a centrally located air inlet port. While such a configuration is not considered essential, it is well suited for installation in the opening formed when a vehicle window is partially rolled down and may be readily installed in the roll-down window opening of a variety of different vehicles. With such an installation, the fitting will normally divide the window opening into two smaller openings, both of which will require sealing. The present invention will readily accommodate this situation. More particularly, the air bag may be sized to permit a first portion of the bag to remain inside the vehicle or other compartment while a second portion merged with the first portion is withdrawn outside the compartment through a first one of the smaller openings and a third portion of the bag merged with said first portion is withdrawn outside the compartment through the other one of the smaller opening. In operation, the first portion inflates inside the compartment while both the second and third portion inflate outside the compartment.

In accordance with a broad aspect of the method of the present invention, there is provided a method of directing a flow of pressurized air from an external source of such air into a compartment through an opening in the compartment. The compartment has an inside and an outside and the opening has a closed perimeter. The method includes the steps of positioning an inflatable air bag in the opening with a first portion of the bag inside the compartment and a second portion of the bag outside said compartment; and inflating the bag with the flow of pressurized air to expand the bag against and thereby provide an air pressure seal against the perimeter of the opening while delivering the flow into said compartment. In a preferred embodiment, the method includes the steps of mounting an air inlet fitting in the compartment opening to form at least one smaller opening having a closed perimeter defined by a portion of an outer perimeter of the fitting and a portion of the perimeter of the compartment opening; connecting an air inlet opening of an air bag in air flow communication with the output opening of an air inlet port in the fitting; positioning a first portion of the bag, including an air outlet opening of the bag, inside the compartment; withdrawing a second portion of the bag outside the compartment through the smaller opening; and, connecting an input opening of the port in air flow communication with the external source to receive the flow of pressurized air from the source. Including its first and second portions, the bag is sized such that the first and second portions are responsive to the flow of air pressurized through the bag to inflate on opposite sides of the smaller opening sufficiently to cause the bag to expand against the compartment and said fitting with air sealing pressure along the perimeter of said smaller opening.

The positioning of portions of the air bag on either side of the smaller opening requires relatively little adjustment or manipulation and is a simple task which can be performed quickly. In response to the flow of pressurized air, sealing action then takes place along the perimeter of the smaller opening, and there is no need to secure the bag elsewhere as, for example, between a door and door frame.

In cases where the installation of the fitting results in more than one smaller opening, then an additional portions of the air bag may be withdrawn outside the compartment through the additional openings, each being appropriately sized to inflate on the outside while the first portion inflates on the inside.

The invention will now be further described with reference to the drawings. The specifics illustrated in the drawings are intended to exemplify, rather than limit, aspects of the invention as defined in the claims.

DETAILED DESCRIPTION

Figure 1:
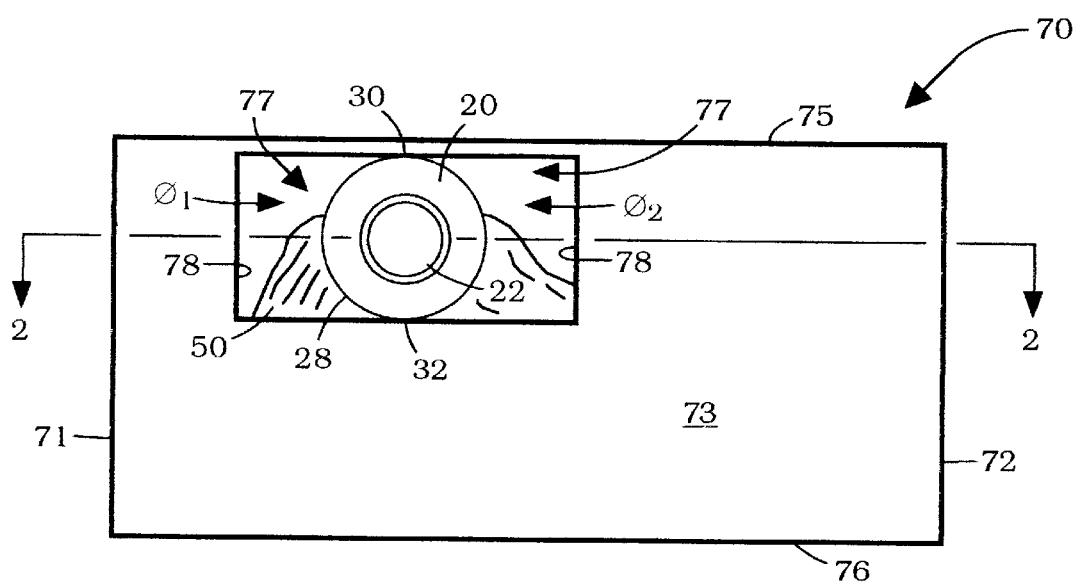
FIG. 1 is a front elevation view in general form of a fitting and air bag apparatus in accordance with the present invention when mounted in an opening in a compartment.

FIGS. 1 to 4 illustrate a compartment designated 70 which comprises a pair of side walls 71, 72, a front wall 73, a rear wall 74, a top wall 75, and a bottom wall 76. The compartment has an inside defined by inside region $C_i$ within its walls and an outside defined by the outside region $C_o$ outside its walls. An air inlet fitting 20 is mounted in opening 77 in front wall 73 of the compartment. Opening 77 is defined by perimeter 78 which extends completely around the fitting. An inflatable air bag 50 is connected to the fitting.

FIGS. 1 to 4 are simplified drawings designed to better illustrate fundamental aspects of the present invention. They are intended to illustrate the invention and its use in a general manner, and not in a specific application as in the case of the embodiment shown in FIG. 5.

Air inlet fitting 20 includes an air inlet port 22 having an input opening 24 for receiving a flow of pressurized air as an input and an output opening 26 for delivering the flow of air as an output. An air conduit 90 (not shown in FIG. 1) serves as a means for connecting input opening 24 in air flow communication with a source of pressurized air (not shown). As best seen in FIG. 1, two smaller openings $Ø_1$, $Ø_2$ are formed when fitting 20 is mounted in opening 77 of compartment 70. Openings $Ø_1$, $Ø_2$ each have a closed perimeter defined by respective portions of perimeter 78 of opening 77 and of outer perimeter 28 of fitting 20.

Air bag 50 includes an air inlet opening 52 which is connected in air flow communication with output opening 26 of port 22, and an outlet opening 54. The bag is inflatable in response to the flow of pressurized air through the bag from inlet opening 52 to outlet opening 54.

Figure 2:
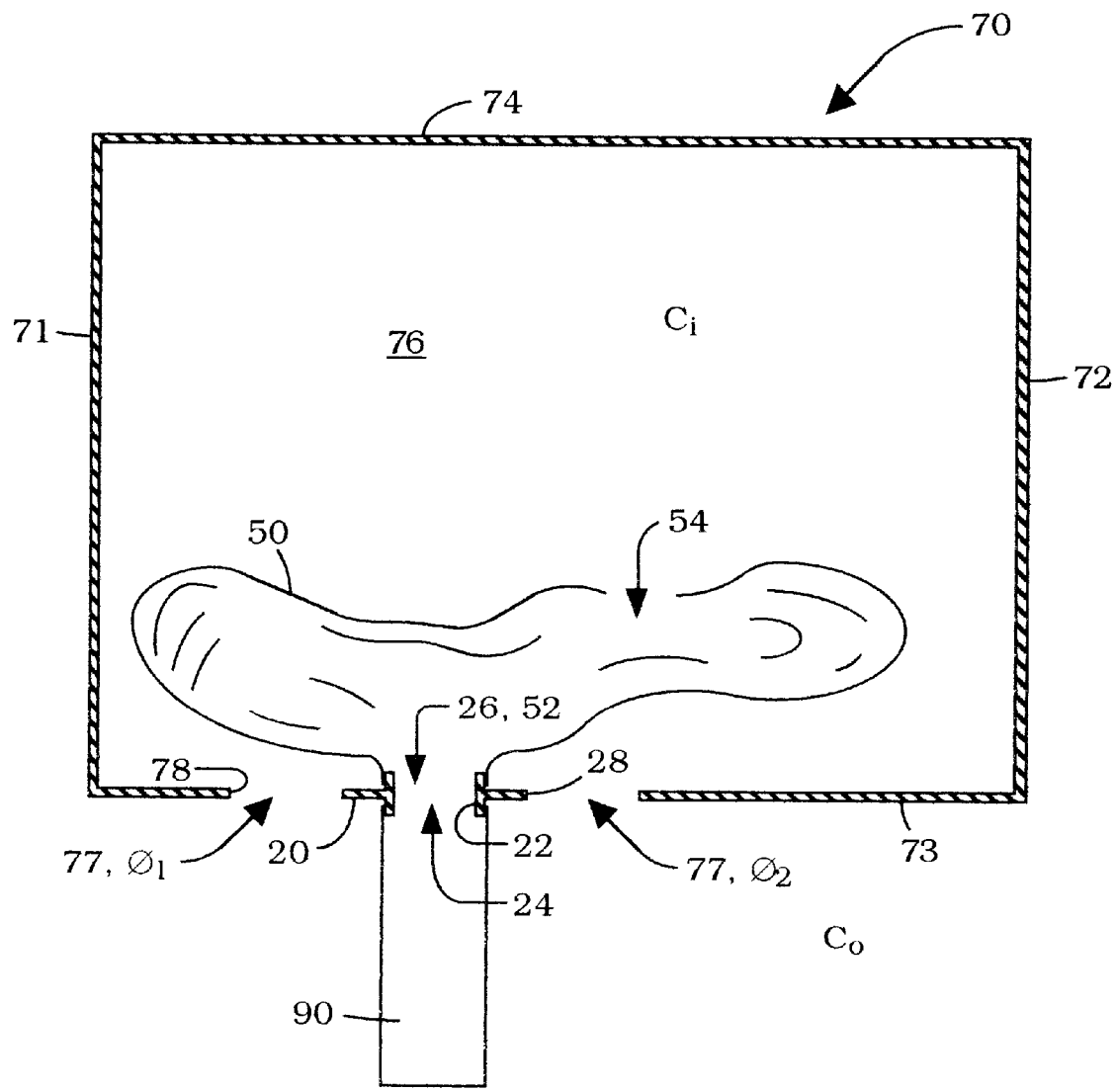
FIG. 2 is a top view taken along section line 2—2 in FIG. 1.
Figure 3:
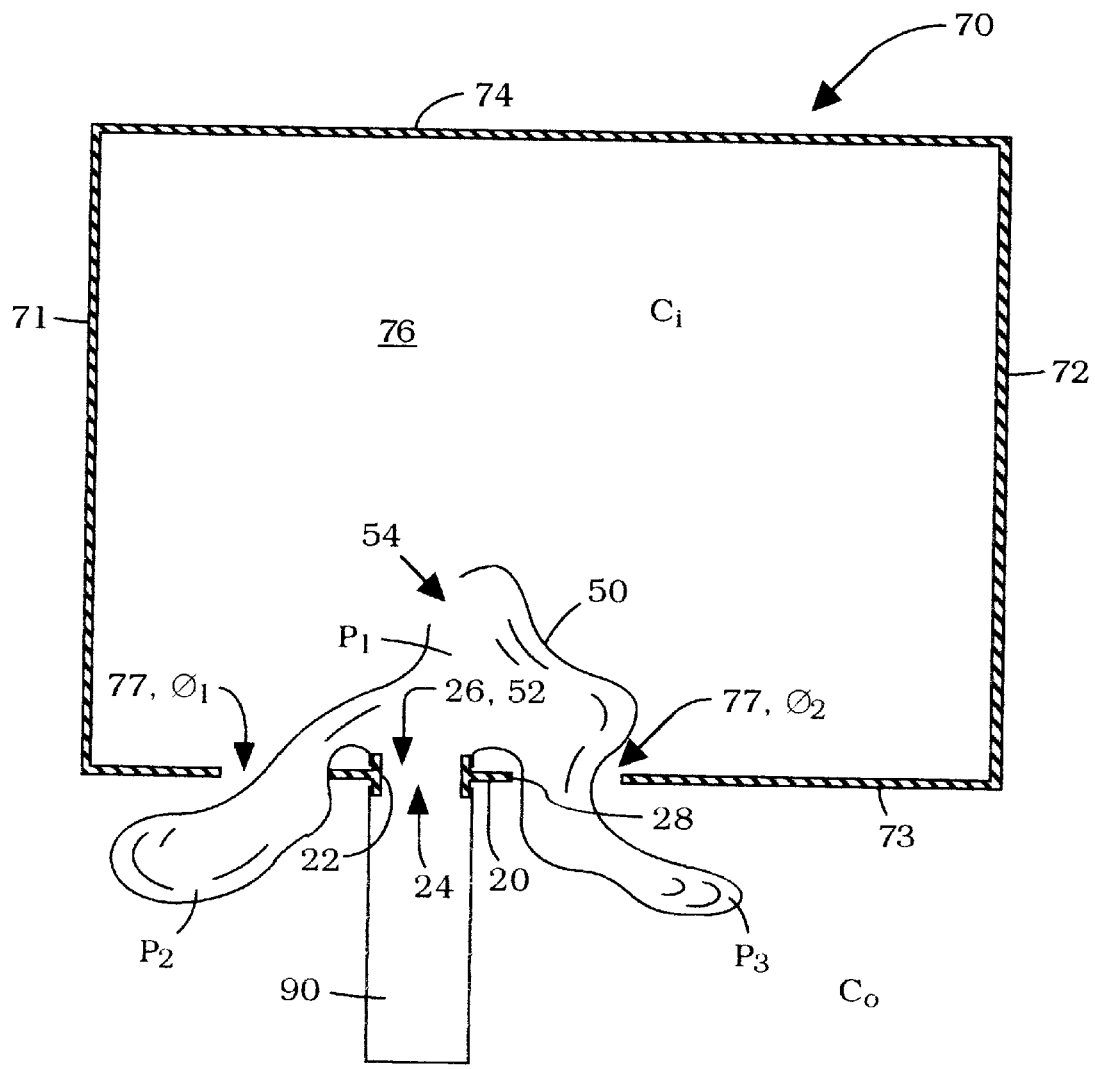
FIG. 3 is a top view, similar to that shown in FIG. 2, taken after portions of the air bag have been withdrawn from the compartment.

The use and operation of the apparatus is shown progressively in FIGS. 1, 2 and 3. In FIG. 2, air inlet fitting 20 has been mounted in opening 77, and inlet opening 52 of air bag 50 has been connected in air flow communication with output opening 26 of port 22. Further, input opening 24 of port 22 has been connected by conduit 90 in air flow communication with a source of pressurized air (not shown). However, as yet, no flow of pressurized air has been established. Air bag 50 drapes loosely within compartment 70.

In FIG. 3, a first portion $P_1$ of air bag 50, including outlet opening 54, remains positioned inside compartment 70 while second and third portions $P_2$, $P_3$, each merged with the first portion, have been withdrawn outside the compartment. Portion $P_2$ has been withdrawn through opening $Ø_1$ Portion $P_3$ has been withdrawn through opening $\emptyset_2$. As yet, there is still no flow of pressurized air.

Figure 4:
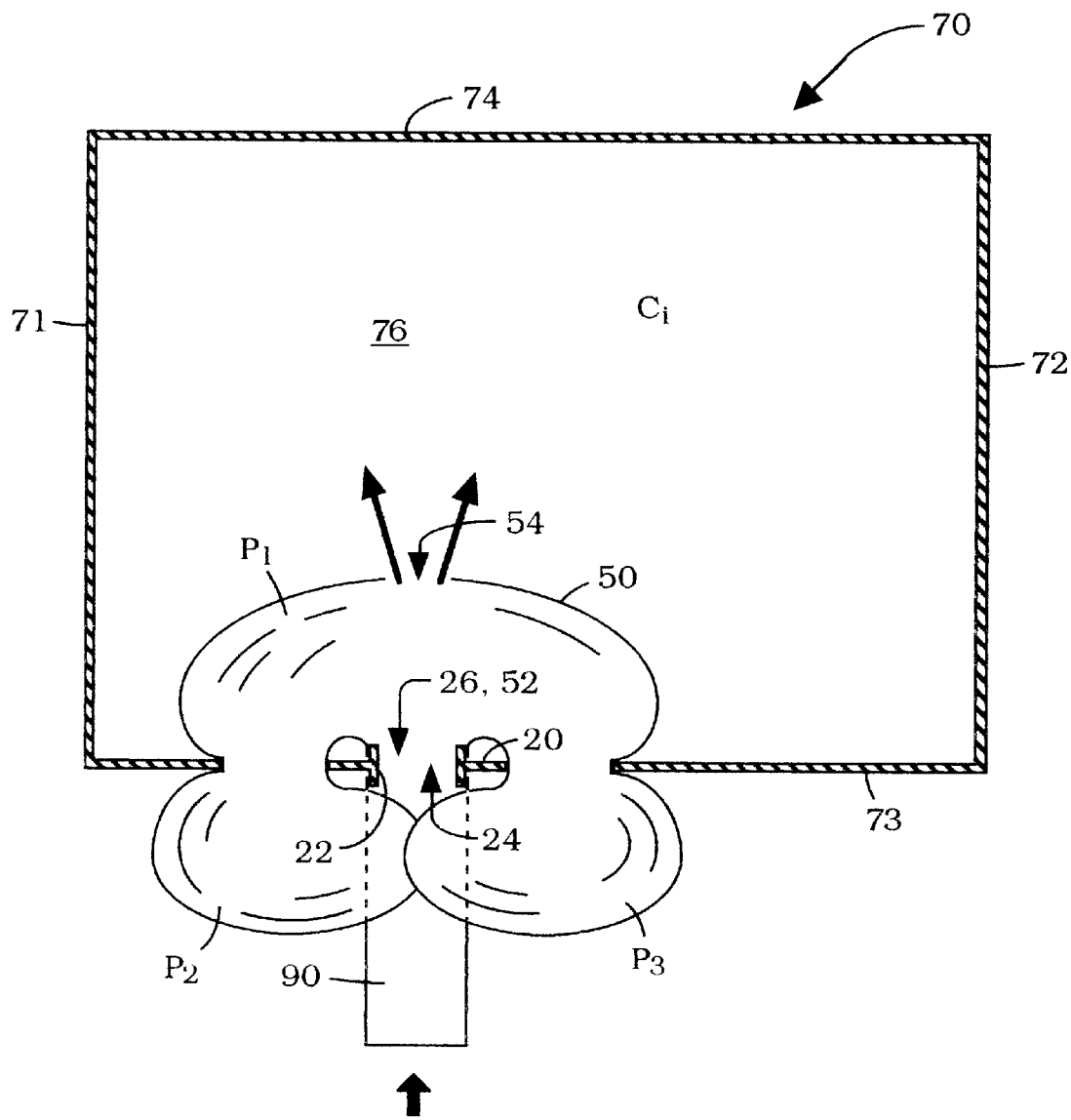
FIG. 4 is a top view, similar to that shown in FIG. 3, taken after inflation of the air bag.

In FIG. 4, a flow of pressurized air (indicated by arrows) has been established via conduit 90. The flow, from conduit 90, is being directed by fitting 20 and air bag 50 to exhaust into compartment 70 through outlet opening 54 of the bag. In response to this flow, portions $P_1$, $P_2$ and $P_3$ have inflated to substantially fill openings $\emptyset_1$ and $\emptyset_2$ formed when fitting 20 was first mounted in opening 77.

As can be seen in FIG. 4, portions $P_2$ and $P_3$ of air bag 50 have inflated to volumes which cannot pass through the sizes of openings $\emptyset_1$ and $\emptyset_2$. With such inflation of portions $P_2$, $P_3$, and the concurrent inflation of portion $P_1$ on the opposed side of the openings, the resulting forces cause air bag 50 to expand against compartment 70 and fitting 20 with air sealing pressure along the perimeters of the openings.

Air bag 50 is necessarily sized to permit portion $P_1$ to remain inside compartment 70 while portions $P_2$ and $P_3$ are withdrawn. However, it will also be apparent that portions $P_1$, $P_2$ and $P_3$ have respective sizes such that inflation can occur on opposite sides of openings $\emptyset_1$ and $\emptyset_2$ with expansion of air bag 50 against the perimeters of those openings. If, for example, insufficient material was withdrawn from compartment 70 for portion $P_2$, then that portion would be pulled back through opening $\emptyset_1$ upon inflation of portion $P_1$. A similar result would follow if insufficient material was withdrawn from compartment 70 for portion $P_3$. In other words, when portion $P_1$ inflates, a natural effect is to try to pull portions $P_2$ and $P_3$ back into compartment 70. However, as shown in FIG. 4, portions $P_2$ and $P_3$ contain sufficient material to offset this effect. When the intersection of portions $P_1$ and $P_3$ expands against the perimeter of opening $\emptyset_1$, and the intersection of portions $P_1$ and $P_3$ expands against the perimeter of opening $\emptyset_2$, then expansion forces within portions $P_2$ and $P_3$, and resulting frictional forces against compartment 70 and fitting 20 provide the offset.

It should be noted the seal which is established along the perimeters of openings $\emptyset_1$ and $\emptyset_2$ will not necessarily be ideally established along the entire lengths of such perimeters. In this regard, it can be seen in FIG. 1 that the angles of intersection between perimeter 78 and circular perimeter 28 of fitting 20 are relatively acute. Thus, when air bag 50 expands, small sectors in openings $\emptyset_1$ and $\emptyset_2$ at these angles may remain unfilled by the material of the bag and some leakage may occur. In principle, this leakage might be reduced by altering the perimeter of the fitting 20 either directly or indirectly, for example by providing removable inserts which can be removably fitted in the acute angles, to provide smoother transitions between perimeter 28 and perimeter 78. However, as a practical matter in many applications, small amounts of leakage at some points along the perimeter of openings $\emptyset_1$ and $\emptyset_2$ is unlikely to represent a problem.

Air bag 50 may be fabricated from various materials, preferably parachute grade nylon or the like. In conjunction with fittings used to direct pressurized air into vehicle compartments, a preferred approach is to fabricate the bag substantially in the form of a pillow slip, but closed at both ends. Then, with the slip or bag effectively laid flat with interior abutment between opposed sides, a hole is cut or drilled directly through both sides thereby forming both an inlet opening and an outlet opening in the bag.

Figure 5:
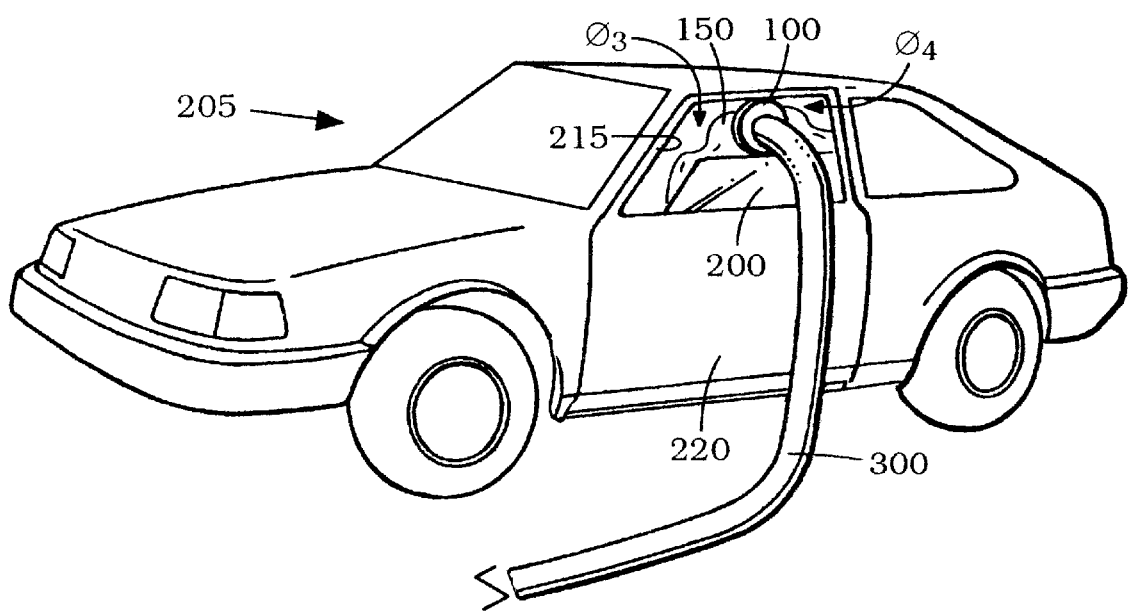
FIG. 5 is a general perspective view of a fitting and air bag apparatus in accordance with the present invention when mounted in a roll-down window opening of a motor vehicle.
Figure 6:
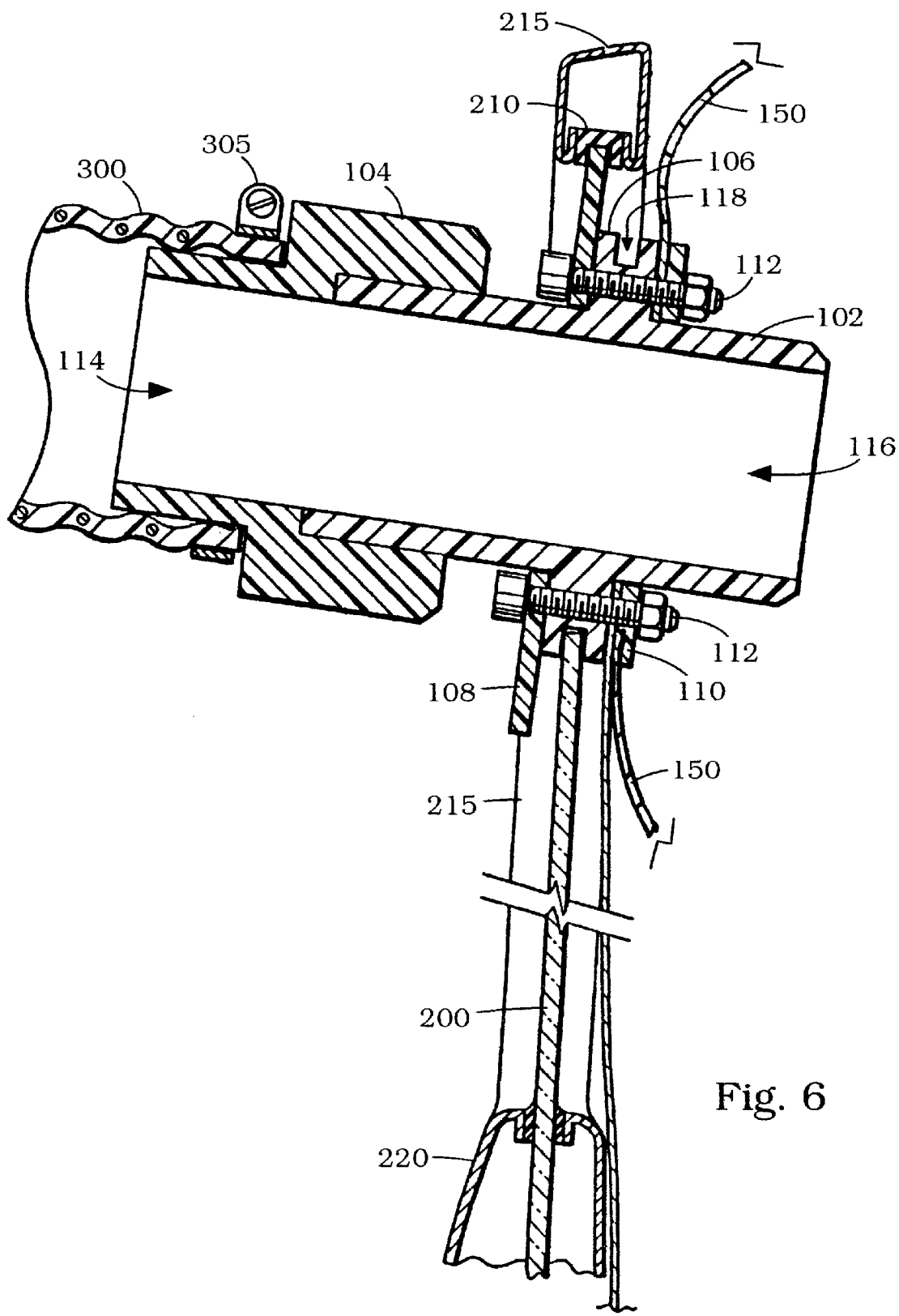
FIG. 6 is a longitudinal cross-section view illustrating in more detail the design and installation of the apparatus shown FIG. 5.

FIGS. 5 and 6 illustrate a preferred embodiment of the present invention used to direct pressurized air into a vehicle compartment. As shown, an air inlet fitting generally designated 100 is mounted in a partially open window 200 of a vehicle generally designated 205. Smaller openings $\emptyset_3$, $\emptyset_4$ (see FIG. 5), each necessarily smaller than the overall window opening, are formed on opposed transverse sides of fitting 100 between the perimeter of the fitting and the perimeter of the window opening. A pillow-shaped air bag 150, only part of which is shown (uninflated), is secured to fitting 100 inside the vehicle compartment. A flexible air conduit 300 is secured to the fitting outside the vehicle compartment and serves to connect the fitting in air flow communication with a source of pressurized air (not shown).

Fitting 100 and conduit 300 are basically the same fitting and conduit as are described in the application of Hubert, supra. Fitting 100 includes central air conduit 102 with a sleeve coupling 104 at one end used to secure conduit 300 by means of a hose clamp 305. A grooved flange 106 encircles and is formed integrally with conduit 102. A relatively large diameter flange 108 and a relatively small diameter flange 110 are secured to flange 106 by means of bolts 112.

Conduit 102 and coupling 104 together form an air inlet port having an input opening 114 for receiving a flow of pressurized air from conduit 300 as an input and an output opening 116 for delivering the flow of air as an output. The output flow is delivered through an inlet opening of air bag 150, the diameter of that opening conforming with the diameter of conduit 102 to permit the bag to be captured around the opening between flanges 102 and 106 as shown in FIG. 6. Although not shown, air bag 150 also includes a circular outlet opening the diameter of which is the same as the diameter of its inlet opening.

Groove 118 in flange 106 is sized to slidingly receive the thickness of window 200 to the position shown in FIG. 6, thereby serving to secure the bottom of fitting 100 against movement. The thickness of flange 108 is sized to be slidingly received by window seal 210 in window frame 215 of the vehicle, thereby serving to secure the top of fitting 100 against movement when window 200 is rolled-up sufficiently to permit such engagement. The fitting is most easily mounted by first opening vehicle door 220 and rolling down window 200 a bit further than the position shown in the Figures, then positioning the fitting with window 200 engaged by groove 118, then raising the window while holding the fitting so that flange 108 is received in window seal 110. Then, door 220 is closed.

The operation of the apparatus shown in FIGS. 5 and 6 is essentially as described with reference to FIGS. 1 to 4, and will not be repeated in detail. With the apparatus mounted as shown, a suitable portion of air bag 150 is first withdrawn through opening $\emptyset_3$ shown in FIG. 5. Another portion is withdrawn through opening $\emptyset_4$. Both portions, and as well the portion remaining within the vehicle compartment, inflate upon the establishment of a flow of pressurized air through the bag to substantially fill openings $\emptyset_3$ and $\emptyset_4$ and to provide air sealing action around the perimeter of those openings.

The apparatus shown in FIGS. 5 and 6 has been found useful for delivering a flow of pressurized air to vehicle compartments, both for the purpose of locating air leaks in such compartments and for the purpose of drying the interior of such compartments. As well, the compartment can be deodorized by injecting ozone into the air flow in a known manner.

Various modifications are possible to the embodiments which have been described herein without departing from the principles of the present invention. Accordingly, the present invention should be understood as encompassing all such modifications as are within the spirit and scope of the claims which follow.

I claim:

1. Apparatus for directing a flow of pressurized air from an external source of such air into a compartment through an opening in said compartment, said compartment having an inside and an outside, said opening having a closed perimeter, said apparatus comprising:
   (a) an air inlet fitting mountable in said compartment opening to form at least one smaller opening having a closed perimeter defined by a portion of an outer perimeter of said fitting and a portion of said perimeter of said compartment opening; said fitting including an air inlet port having an input opening for receiving said flow of air as an input from said source, and an output opening for delivering said flow of air as an output;
   (b) an air bag having an air inlet opening and an air outlet opening, said bag being inflatable in response to the continuing flow of pressurized air through said bag from said inlet opening to said outlet opening;
   (c) means for connecting said input opening of said port in air flow communication with said source; and,
   (d) means for connecting said air inlet opening of said air bag in air flow communication with said output opening of said port, said air bag being sized to permit a first portion of said bag to remain inside said compartment while a second portion of said bag merged with said first portion is withdrawn outside said compartment through said smaller opening, said first portion including said outlet opening, said first and second portions having respective sizes such that they are then responsive to said flow of air through said bag to inflate on opposite sides of said smaller opening sufficiently to cause said bag to expand against said compartment and said fitting with air sealing pressure along said perimeter of said smaller opening.

2. Apparatus as defined in claim 1, wherein said compartment opening is a window opening.

3. Apparatus as defined in claim 1, wherein said compartment is a passenger compartment of a vehicle, and wherein said compartment opening is a roll-down window opening.

4. Apparatus for directing a flow of pressurized air from an external source of such air into a compartment through an opening in said compartment, said compartment having an inside and an outside, said opening having a closed perimeter, said apparatus comprising:
   (a) an air inlet fitting mountable in said compartment opening to form first and second smaller openings, said first smaller opening having a closed perimeter defined by a first portion of an outer perimeter of said fitting and a first portion of said perimeter of said compartment opening, said second smaller opening having a closed perimeter defined by a second portion of said outer perimeter of said fitting and a second portion of said perimeter of said compartment opening, said fitting including an air inlet port having an input opening for receiving said flow of air as an input from said source, and an output opening for delivering said flow of air as an output;
   (b) an air bag having an air inlet opening and an air outlet opening, said bag being inflatable in response to the continuing flow of pressurized air through said bag from said inlet opening to said outlet opening;
   (c) means for connecting said input opening of said port in air flow communication with said source; and,
   (d) means for connecting said air inlet opening of said air bag in air flow communication with said output opening of said port, said air bag being sized to permit a first portion of said bag to remain inside said compartment while a second portion of said bag merged with said first portion is withdrawn outside said compartment through said first smaller opening and a third portion of said bag merged with said first portion is withdrawn outside said compartment through said second smaller opening, said first portion including said outlet opening, said first, second and third portions having respective sizes such that:

(A) said first and second portions are then responsive to said flow of air through said bag to inflate on opposite sides of said first smaller opening sufficiently to cause said bag to expand against said compartment and said fitting with air sealing pressure along said perimeter of said first smaller opening; and,
   (B) said first and third portions are then responsive to said flow of air through said bag to inflate on opposite sides of said first smaller opening sufficiently to cause said bag to expand against said compartment and said fitting with air sealing pressure along said perimeter of said second smaller opening.

5. Apparatus as defined in claim 4, wherein said compartment opening is a window opening.

6. Apparatus as defined in claim 4, wherein said compartment is a passenger compartment of a vehicle, and wherein said compartment opening is a roll-down window opening.

7. A method of directing a flow of pressurized air from an external source of such air into a compartment through an opening in said compartment, said compartment having an inside and an outside, said opening having a closed perimeter, said method comprising the steps of:
   (a) mounting an air inlet fitting in said compartment opening to form at least one smaller opening having a closed perimeter defined by a portion of an outer perimeter of said fitting and a portion of said perimeter of said compartment opening, said fitting including an air inlet port having an input opening for receiving said flow of air from said source as an input, and an output opening for delivering said flow of air as an output;
   (b) connecting an air inlet opening of an air bag in air flow communication with said output opening of said port, said bag including an air outlet opening, said bag being inflatable in response to the said flow of air through said bag from said inlet opening to said outlet opening;
   (c) positioning a first portion of said bag, including said outlet opening, inside said compartment;
   (d) withdrawing a second portion of said bag outside said compartment through said smaller opening; and,
   (e) connecting said input opening of said port in air flow communication with said source to receive said flow of air, said air bag, including said first and second portions, being sized such that said first and second portions are responsive to said flow of air through said bag to inflate on opposite sides of said smaller opening sufficiently to cause said bag to expand against said compartment and said fitting with air sealing pressure along said perimeter of said smaller opening.

8. A method as defined in claim 7, said compartment including at least one opening distanced away from said compartment opening, said distanced opening permitting the escape of pressurized air from said inside of said compartment.

9. A method as defined in claim 7, wherein said compartment opening is a window opening.

10. A method as defined in claim 7, said compartment including first and second openable windows distanced away from each other, said method including the steps of:
 (a) opening said first window at least partially to provide said compartment opening; and,
 (b) opening said second window sufficiently to permit the escape of pressurized air from said inside of said compartment through said second window.

11. A method as defined in claim 7, wherein said compartment is a passenger compartment of a vehicle having an openable window, said method further including the step of opening said window at least partially to provide said compartment opening.

12. A method as defined in claim 11, said passenger compartment including a second openable window, said method further including the step of opening said second window sufficiently to permit the escape of pressurized air from said inside of said compartment through said second window.

* * * * *